United States Patent [19]

Bergkvist

[11] 4,336,659

[45] Jun. 29, 1982

[54] ANGLE INDICATOR FOR INDICATING TWO MUTUALLY PERPENDICULAR DIRECTIONS

[76] Inventor: Lars A. Bergkvist, Gottne, 890 42 Mellansel, Sweden

[21] Appl. No.: 221,374

[22] Filed: Dec. 30, 1980

Related U.S. Application Data

[63] Continuation of Ser. No. 40,393, May 18, 1979, abandoned.

[30] Foreign Application Priority Data

May 25, 1978 [SE] Sweden ................................ 7806036

[51] Int. Cl.³ ................................................ G01C 9/16
[52] U.S. Cl. ..................................................... 33/395
[58] Field of Search ...................................... 33/391, 395

[56] References Cited

U.S. PATENT DOCUMENTS 3,618,222  11/1971  Ostrager .................................. 33/348
3,724,087  4/1973  Ostrager .................................. 33/348
3,945,129  3/1976  Bergkvist .......................... 33/391 X Primary Examiner—Charles E. Phillips
Attorney, Agent, or Firm—LeBlanc, Nolan, Shur & Nies

[57] ABSTRACT

An angle indicator for indicating two mutually perpendicular directions and including two moire screen angle indicating devices, each including several screens consisting of opaque lines separated by transparent gaps with the screens of each device positioned parallel to one another to provide a moire interference pattern. One screen can be fixed and the other freely rotatable to adopt a predetermined position relative to the plumb line. The two devices, each with its pair of screens, are positioned in mutually perpendicular planes, and a mirror is fitted and arranged to project a mirror image of one device in a plane in which the pair of screens of the second device is located, and by the side of the second device so the moire patterns formed at both of the angle indicating devices appear to be lying beside each other when the angle indicator is viewed.

5 Claims, 8 Drawing Figures

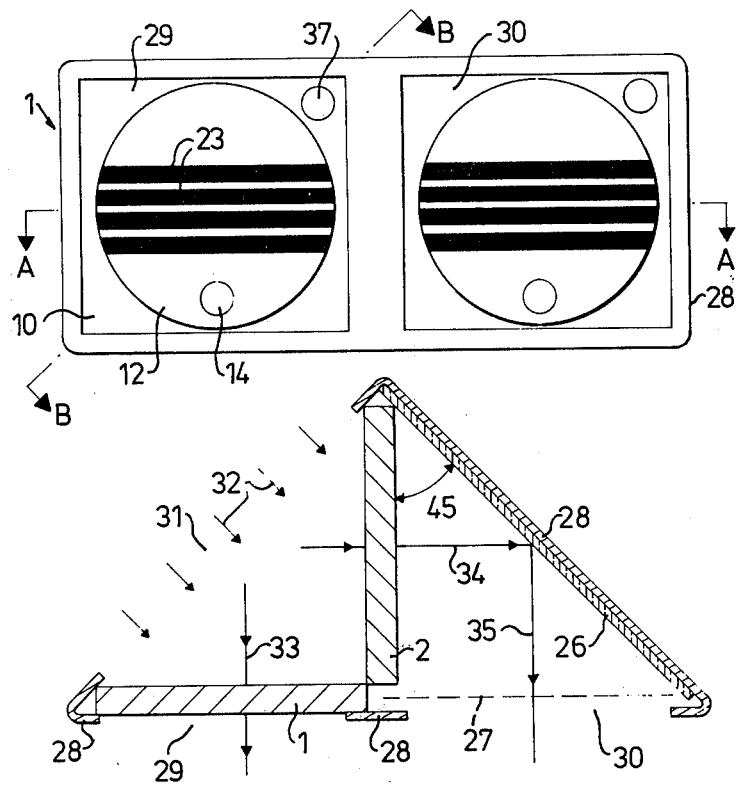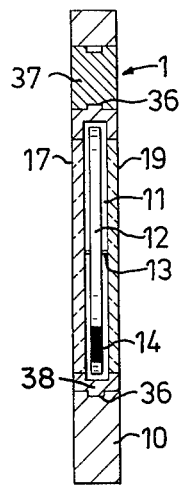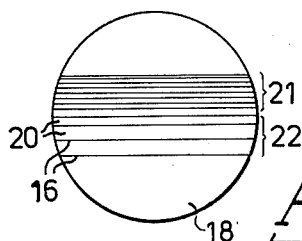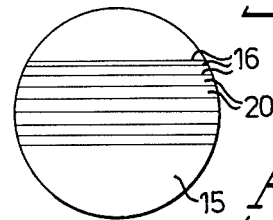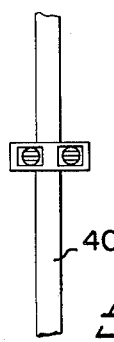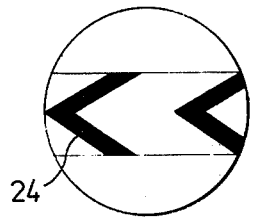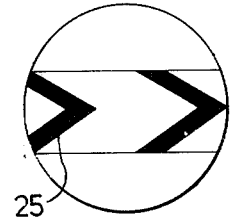

ANGLE INDICATOR FOR INDICATING TWO MUTUALLY PERPENDICULAR DIRECTIONS

CROSS-REFERENCE TO RELATED APPLICATION

This application is a continuation of application Ser. No. 40,393 filed May 18, 1979 now abandoned.

The invention presented here refers to an angle indicator for two mutually perpendicular directions, particularly intended for the indication and alignment of an object in two mutually perpendicular direction relative to the plumb-line.

An object can be aligned to an arbitrary position relative to the plumb-line by means of alignment in two mutually perpendicular directions. The use of optical indicating instruments such as spirit-levels or angle indicating instruments as per Swedish Pat. No. 7307577-2 (which corresponds to applicant's U.S. Pat. No. 3,945,129) requires two instruments, which makes simultaneous reading of both instruments during alignment difficult.

In the case of levels with a concentrically positioned indicator marking in the form of a ring, one instrument is per se adequate, but generally such as instrument must be observed from above and often it does not provide adequate precision due to the difficulty involved in reading it correctly.

An example of alignment of the said type is the alignment of drill booms. In this context it is necessary to be able to observe an instrument showing the position in two perpendicular directions in a lucid manner, and it is necessary to be able to make rapid adjustments with a high degree of precision.

The invention presented here offers a very simple instrument for the said type of indication and alignment that is also extremely easy to read with a very high degree of precision.

Swedish Pat. Nos. 7307577-2 and 7611511-2 describe an angle indicating device comprising a first part, a mounting, and a part movable relative to the mounting. The mounting and the movable part comprise screens consisting of opaque lines separated by transparent gaps. The division of the respective screens, i.e. the number of opaque lines per unit of length perpendicular to the opaque lines is varied whereby an additional optical interference pattern, a so-called moiré pattern, is created when light is transmitted through the screens.

The device is designed to indicate an angle relative to the plumb-line.

The said patent shows the extremely high degree of precision with which the indication of alignment can be effected using such instruments. Moreover, the said patent shows that a particular pre-determined angle position can easily be read with a high degree of precision in that the interference pattern can be considerably altered for an extremely slight change of angle from the pre-determined value.

Thus the invention presented here refers to an angle indicator for indicating two mutually perpendicular directions and comprising two angle indicating devices e.g. as per Swedish Pat. No. 7611511-2 which each comprise a couple of screens, each screen consisting of opaque lines separated by transparent gaps and the screens positioned parallel to one another, whereby an interference pattern, so-called moiré pattern, is formed when light is transmitted through each screen unit, and where the first screen is fixed and the other can be freely rotated to adopt a pre-determined position relative to the plumb-line.

The invention is characterized by the fact that the two pairs of screens are positioned in mutually perpendicular planes, and by the fact that a mirror is fitted and arranged to project a mirror image of second of the said pair of screens in a plane in which a first pair of the said pair of screens, is, and by the side of the last mentioned pair, whereby the two moiré patterns formed through the angle indicating devices appear to be lying beside each other when the angle indicator is viewed.

The invention is described below in more detail in connection with the appended drawing, where FIG. 1 shows the angle indicator as per the invention viewed from the front, FIG. 2 shows a horizontal cross-section A—A as per FIG. 1, FIG. 3 shows schematically a cross-section through an angle indicating device, FIGS. 4 and 5 show two screen discs, FIGS. 6 and 7 show two different moiré patterns, FIG. 8 shows schematically an angle indicator mounted on a schematically illustrated object, for example a drill boom.

FIGS. 1 and 3 show indicating devices 1 of the type specified in Swedish patent mentioned above.

FIG. 3 shows a cross-section through device 1. The device comprises a mounting 10, which, for example, has the form of a rectangular or square housing. Housing 10 has an inner cavity 11, which advisably has the form of a circular cylindrical space. In cavity 11 is a movable part 12 journalled around an axle 13. The centre of gravity of the movable part 12 is displaced outside the rotating axle by a part 14 with a higher density than the part in general is fitted between the rotating axle 13 and the periphery of the movable part 12. Thus it is clear that the movable part is always rotated so that a line through its rotating axle and centre of gravity coincides with the plumb-line.

The movable part 12 is in the form of a screen disc 15, see FIG. 5, with a screen consisting of opaque lines 16, which for the sake of clarity are shown as thin lines. The housing 10 wall 17 facing a viewer likewise contains a screen disc 18, see FIG. 4, with a screen consisting of opaque lines 16. The housing 10 wall 19 facing away from a viewer is advisably transparent. The structure of the screens can, of course, be varied without departing from the invention presented here, but in accordance with a preferred design the opaque lines 16 have a width of 0.6 mm and the transparent gaps 20 a width of less than 0.6 mm. In accordance with a preferred design the movable part's 12 screen 15 has a constant division, while the fixed part's 17 screen 18 is divided into two fields 21, 22 with different divisions. The fields are advisably divided by a diameter of the screen disc 18. One of these fields 21 has a closer division than the movable part's screen 15 and the other of the said fields 22 has a correspondingly wider division than the movable part's screen 15. The divisions mentioned provide a moiré pattern comprising broad dark mutually parallel strips 23, see FIG. 1, when the two screen discs' 15, 18 opaque lines 16 are mutually parallel. When the movable part 12 is turned clockwise a slight angle relative to the housing 10, due to the fact that the opaque lines 16 on the two screen discs 15, 18 will form mutually the said angle, a moiré pattern, shown in FIG. 6, is formed where the broad strips 24 are angled to the fixed part's screen 18 and reflected in the diameter which separates the two fields 21, 22 mentioned so that the strips resemble arrows. When the movable part 12 is turned anti-clockwise a slight angle relative to the housing 10, the moiré pattern, shown in FIG. 7, will be formed in an equivalent way with braod dark strips 25, resembling arrows, but pointing in the opposite direction to those shown in FIG. 6.

These moiré patterns are very sensitive to small changes in angle and are extremely easy to read, whereby adjustment by means of such an angle indicator can be effected with a high degree of precision. In accordance with the invention presented here two angle indication devices 1, 2 of the type stated above are used. The angle indicating devices are preferably identical.

Each angle indicator 1, 2 comprises a couple of screens 15, 18. The two pairs of screens 15, 18 are in accordance with the invention presented here positioned in mutually perpendicular planes, see FIG. 2, whereby each and every one of the pairs is arranged to indicate an object's position in one of two mutually perpendicular planes. With a view to permitting simultaneous reading of both indicating devices there is a mirror 26 fitted to project a mirror image of a second pair of screens, mounted in a second of the indicating devices 2, in the plane in which the first pair of screens is. In FIG. 2 this plane is marked by the broken line 27.

Hereby when viewing the angle indicator as per the invention the two moiré patterns formed through the angle indicating devices 1, 2 appear to be lying beside each other, as shown in FIG. 1, where the righthand angle indicating device is a mirror image.

The said mirror 26 is fitted in a plane parallel with the forming of 45° angle, see FIG. 2, to the second pair of screen units mounted in the second angle indicating device 2.

In addition the two angle indicating devices 1, 2 are preferably fitted primarily edge to edge with each other.

Mirror 26 is in accordance with this preferred design arranged so that it stretches from the edge of second angle indicating device 2 furthest from the first angle indicating device 1 and primarily up to the plane 27, in which the first angle indicating device is positioned.

The angle indicating devices 1, 2 and the mirror 26 are fitted in a mutual enclosing housing 28 with a primary large opening 29 for direct observation of the first angle indicating device and an equally large opening 30 for observation of a mirror image of the second indicating device.

In the latter mentioned housing's 28 rear side which faces the two indicating devices 1, 2 is an opening 31 for letting in light 32, which is transmitted partly, as arrow 33 shows, through the first indicating device and partly, as shown by arrows 34, 35, through the second indicating device and thereafter reflected by the mirror 26.

FIG. 8 shows an angle indicator as per the invention mounted on an object, for example a drill boom. In FIG. 8 the object 40 is shown in the vertical position.

When the object, for example, deviates from the plumb-line viewed in a plane parallel with the first of the indicating devices, but coincides with the plumb-line viewed in a plane parallel with the second indicating device, the second indicating device will show a pattern corresponding to that shown in FIG. 6 or 7, while the first indicating device will exhibit a pattern corresponding to that shown in FIG. 1.

When the object deviates from the plumb-line viewed in both the respective planes which are parallel with the respective indicating devices both will exhibit a pattern as shown in FIG. 6 or 7.

As mentioned above a pattern as shown in FIG. 6 or 7 will show in which direction relative to the plumb-line the indicating device's housing 10, 28 must be turned in order to achieve a position where the angle indicating device is vertical and thus a pattern as that shown in FIG. 1 appears. This renders the adjustment of an object considerably easier.

In accordance with a preferred design of the invention the said fixed part, i.e. the screen 18 which is fitted in the housing 10 wall 17, is rotatably adjustable relative to the angle indicating device's housing 10. In this context there is a gear ring 36 or similar unit which is fitted around the fixed part's periphery, which gear ring 36 meshes with a gear wheel 37 or similar which is journalled in housing 10. The gear ring runs in this context in a circular groove 38 in housing 10. Advisably a scale indicator, not shown, is fitted to the outside of the housing 10 showing the current angle between the fixed part's screen's 18 opaque lines 16 and a side of the housing 10, which side when a pattern corresponding to that shown in FIG. 1 is perpendicular to or coincides with the plumb-line.

Thus it is perfectly clear that the invention presented here can be used to adjust an object at an arbitrary angle to the plumb-line in two mutually perpendicular planes by first adjusting the two angle indicating devices' fixed screens 18 so that their screen lines form the desired angle with housing 10 by means of, for example, the scale indicator mentioned. Thereafter the object is aligned at an angle to the plumb-line so that both the indicating devices generate a moiré pattern the plumb-line is the desired and adjusted angle mentioned.

The invention presented here therefore offers a very easily read instrument for the said alignment of objects by means of which a high degree of precision can be achieved. Due to the two indication devices' positioning and the said mirror the two moiré patterns can be observed simultaneously, which renders considerably easier rapid and precise reading and thereby a rapid and precise alignment.

Obviously modifications of the invention are conceivable without departure from the concept of the invention. For example, the mirror can be exchanged for several mirrors, and the said screens can have other divisions than those stated above. Moreover the indicating instruments can be modified.

The invention presented here should not therefore be considered to be restricted to the design stated above, but can be varied within the framework set forth in the appended patent claim.

I claim:

1. Angle indicator for indicating an arbitrary angle to a plumb line in two mutually perpendicular directions comprising two angle indicating devices which each comprise a couple of screens where each screen consists of opaque lines separated by transparent gaps and where screens are placed parallel to one another, whereby interference patterns, so-called moire patterns, are formed when light is transmitted through each of the screen units and where the first screen is rotatably adjustable and the other freely rotable to a pre-determined position relative to the plumb-line, characterized by the fact that each one of the pairs of screens are placed in mutually perpendicular planes and by the fact that a mirror is mounted in a plane which intersects the planes of the two pairs of screens at parallel lines of intersection to project a mirror image of the second of said pair of screens in one plane in which a first pair of said pair of screens is located and to the side of said first pair, whereby in viewing the angle indicator the two moire patterns formed through the two angle indicating devices appear to be lying beside each other; a common housing mounts said mirror and both devices with means enabling rotatable adjustment of said first screens of each device.

2. Angle indicator as defined in claim 1, characterized by the fact that said mirror is mounted at an angle of 45° with both pairs of screens in said angle indicating devices.

3. Angle indicator as defined in claim 2, characterized by the fact that the two angle indicating devices are fitted substantially edge to edge with each other and by the fact that said mirror is mounted to extend from adjacent the edge of the second angle indicating device that is furthest from the first angle indicating device to a location substantially adjacent the plane in which the first angle indicating device is located.

4. Angle indicator as defined in claim 2, characterized by the fact that the two angle indicating devices and the mirror are fitted in said common housing, which includes an aperture substantially as large as the first indicating device, for direct observation of the first indicating device, the aperture enabling observation of a mirror image of the second indicating device.

5. Angle indicator as defined in claim 1, characterized by the fact that the screens in one or both of the indicating devices are so designed that one screen has one division and the other screen is divided parallel with the screen lines into two fields where one field has a wider division and the other field a closer division than the said one screen.

* * * * *

UNITED STATES PATENT AND TRADEMARK OFFICE
CERTIFICATE OF CORRECTION

PATENT NO. : 4,336,659
DATED : June 29, 1982
INVENTOR(S) : Lars A. Bergkvist

It is certified that error appears in the above-identified patent and that said Letters Patent are hereby corrected as shown below:

Column 4, line 35, after "pattern" insert --comprising parallel dark strips, whereby the object's angle relative to--.

Column 4, line 40 change "indication" to --indicating--.

Column 3, line 6 change "braod" to --broad--.

Signed and Sealed this

Fourteenth Day of September 1982

[SEAL]

Attest:

GERALD J. MOSSINGHOFF

Attesting Officer   Commissioner of Patents and Trademarks